US012711321B2

(12) United States Patent
Sharma et al.

(10) Patent No.: US 12,711,321 B2
(45) Date of Patent: Aug. 18, 2026

(54) HEURISTIC EXPRESSIONS FOR FLOW BUILDER CONDITIONALS

(71) Applicants: Nikhil Sharma, San Francisco, CA (US); Vidhu Priya, San Francisco, CA (US)

(72) Inventors: Nikhil Sharma, San Francisco, CA (US); Vidhu Priya, San Francisco, CA (US)

( * ) Notice: Subject to any disclaimer, the term of this patent is extended or adjusted under 35 U.S.C. 154(b) by 39 days.

(21) Appl. No.: 18/418,272

(22) Filed: Jan. 21, 2024

(65) Prior Publication Data

US 2025/0238628 A1 Jul. 24, 2025

(51) Int. Cl.
*G06F 40/40* (2020.01)

(52) U.S. Cl.
CPC .................................... *G06F 40/40* (2020.01)

(58) Field of Classification Search
CPC ................................ G06F 40/40; G06F 40/30
See application file for complete search history.

(56) References Cited

U.S. PATENT DOCUMENTS

2016/0275946 A1* 9/2016 Caseiro ................. G06F 40/216
2020/0097263 A1* 3/2020 Lodhia ................. G06V 30/422
2023/0135179 A1* 5/2023 Mielke ................... G06N 5/022 704/232
2023/0252233 A1* 8/2023 Gutierrez ................ G06F 40/40 704/9
2023/0401631 A1* 12/2023 McCracken ....... G06Q 30/0633
2023/0418829 A1* 12/2023 Iyer ................... G06F 16/24575
2024/0305589 A1* 9/2024 Dan ......................... H04L 51/02
2025/0077844 A1* 3/2025 Lin ...................... G06N 3/0475
2025/0111167 A1* 4/2025 Mcintyre .............. G06F 16/383
2025/0165721 A1* 5/2025 Eisenstadt ............... G06F 40/40
2025/0173654 A1* 5/2025 Badichi ................. G06F 40/186

* cited by examiner

*Primary Examiner* — Daniel C Washburn
*Assistant Examiner* — Paul J. Mueller

(57) ABSTRACT

In one aspect, a computerized method comprising: providing a user-specified condition, wherein the user-specified condition comprises a flow builder conditional that the user specifies what is to be tested for on a heuristic basis; with a condition optimizer; obtains a user input, wherein the user input is obtained from the user specified condition, wherein the user-specified condition is in a freeform, and optimizes the user-specified condition by rewriting the user-specified condition in a form that is most likely generate an output of a prediction with a highest accuracy; with the optimized form of the user-specified condition, structuring a conditional prompt; passing the conditional prompt to a large language model (LLM), wherein the conditional prompt comprises the information that is input into the LLM to obtain an LLM output; and with the LLM, performing a model that makes an inference about the conditional prompt along with a base prompt for asking a large language model for prediction to obtain a predicted evaluation.

10 Claims, 7 Drawing Sheets

HEURISTIC EXPRESSIONS FOR FLOW BUILDER CONDITIONALS

BACKGROUND

Large Language Models (LLMs) are a type of generative AI model that have seen a massive explosion in both research output and industry adoption over the last few years There has been an almost pervasive movement for the adaptation of language modeling into software applications. LLMs (e.g. GPT-4 from OpenAI, PaLM from Google, LLaMa from Meta, Dolly from Databricks, etc.) make it easy to create applications that are able to simulate human-like conversations and provide responses to prompts that are highly personalized and detailed. One of the powerful attributes of LLMs is their ability to achieve near or at state-of-the-art performance almost automatically on a wide variety of learning tasks.

There is a desire to use these powerful attributes of LLMs for introducing heuristic expressions for conditional nodes in visual flow builders. LLMs such as those mentioned above are often able to use their built-in general knowledge as well as some basic domain-specific information provided via "in-context" or "few-shot" learning directly in language model prompts in order to generate a semantically-informed prediction to free-form conditional statements written in plain language. Few-shot learning can be optimized by increasing the number of "shots" or examples and tuning the surrounding system prompts passed to an LLM via prompt engineering.

SUMMARY OF THE INVENTION

In one aspect, a computerized method comprising: providing a user-specified condition, wherein the user-specified condition comprises a flow builder conditional that the user specifies what is to be tested for on a heuristic basis; with a condition optimizer; obtains a user input, wherein the user input is obtained from the user specified condition, wherein the user-specified condition is in a freeform, and optimizes the user-specified condition by rewriting the user-specified condition in a form that is most likely generate an output of a prediction with the highest accuracy; with the optimized form of the user-specified condition, structuring a conditional prompt; passing the conditional prompt to a large language model (LLM), wherein the conditional prompt comprises the information that is input into the LLM to obtain an LLM output; and with the LLM, performing a model that makes an inference about the conditional prompt along with a base prompt for asking a large language model for prediction to obtain a predicted evaluation.

Figure 1:
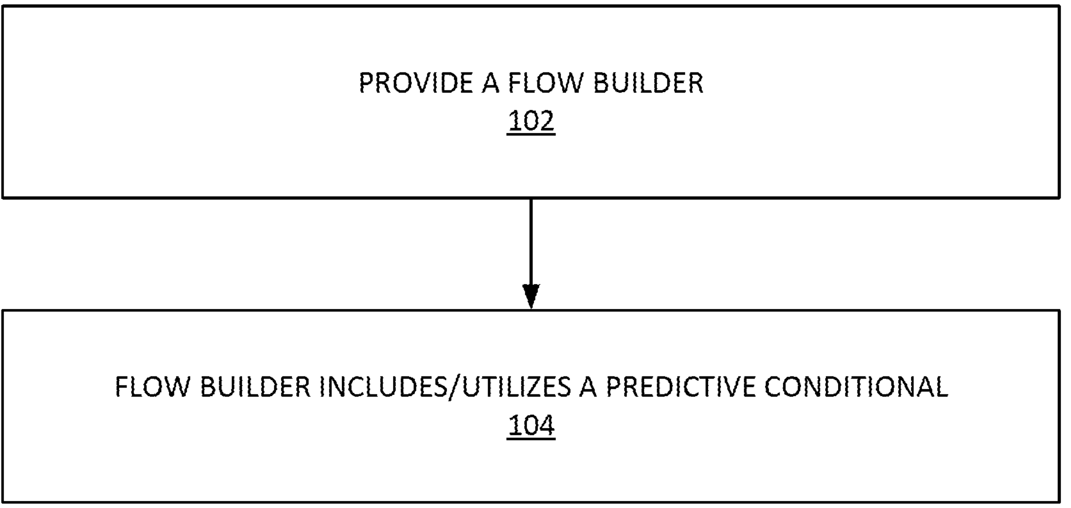
FIG. 1 illustrates an example process for heuristic expressions for flow builder conditionals, according to some embodiments.
Figure 1:
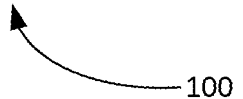

The Figures described above are a representative set and are not exhaustive with respect to embodying the invention.

DESCRIPTION

Disclosed are a system, method, and article of manufacture for heuristic expressions for flow builder conditionals. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application program is a computer program designed to carry out a specific task other than one relating to the operation of the computer itself and can be used by end-users.

Base prompt can be a pre-hydration. In other words, it can be a prompt that is still in template-form, without having been filled in with specific data by the data augmenter.

Customer relationship management (CRM) can be a system/process in which a business or other organization administers its interactions with customers (e.g. using data analysis to study large amounts of information, etc.).

Flow builder can include a declarative interface. Flow builders can include visual tools that build custom workflows. Flow builders can be used to write the logic of a code with a visual programming language. A set of flow builders can generate individual flows.

Generative Pre-trained Transformer 4 (GPT-4) is a multimodal large language model created by OpenAI, and the fourth in its numbered "GPT-n" series of GPT foundation models. As a transformer-based model, GPT-4 was pre-trained to predict the next token (e.g. using both public data and data licensed from third-party providers) and was then fine-tuned with reinforcement learning from human and AI feedback for human alignment and policy compliance. It is noted that other multimodal large language models can be utilized in other example embodiments.

Large language model (LLM) is a language model characterized by emergent properties enabled by its large size. An LLM can be built with artificial neural networks. These can be pre-trained. The training can utilize self-supervised learning and/or semi-supervised learning. For example, artificial neural networks can contain tens of millions to billions of weights. The LLMs can be trained using a specialized AI accelerator hardware to parallel process vast amounts of text data, mostly scraped from the Internet. As language models, they work by taking an input text and repeatedly predicting the next token or word.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, logistic regression, and/or sparse dictionary learning. Random forests (RF) (e.g. random decision forests) are an ensemble learning method for classification, regression, and other tasks, which operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Predicted evaluation can be the "yes" or "no" that's output by evaluating a heuristic expression.

Social graph is a graph that represents social relations between entities. The social graph is a model or representation of a social network.

Social network is a social structure made up of a set of social actors (e.g. individuals, organizations, etc.), sets of dyadic ties, and other social interactions between actors. The social network perspective provides a set of methods for analyzing the structure of whole social entities as well as a variety of theories explaining the patterns observed in these structures.

These systems and functions can be incorporated into various embodiments discussed herein.

Example Systems and Methods

FIG. 1 illustrates an example process 100 for heuristic expressions for flow builder conditionals, according to some embodiments. In step 102, a flow builder can be provided. These flow builders can serve as a high-level visual programming framework (e.g. with limited features and capabilities, etc.). They can support conditional nodes. A conditional node can be a node type that enables branching based on the result of evaluating a condition. These conditionals can be algorithmic in that the expressions they evaluate are rule-based and deterministic. For example, "does the Instagram user that triggered this flow have at least 10000 followers?" or "has this Instagram user engaged with my content in the past".

In step 104, the flow builder can utilize a predictive conditional. The predictive conditional can trade off the deterministic accuracy of algorithmic conditionals in exchange for flexibility by instead synthesizing all the data available to them about a specific user to make a holistic prediction about whether they satisfy a free-format, user-specified condition. In other words, a condition that is specified in natural language.

Figure 2:
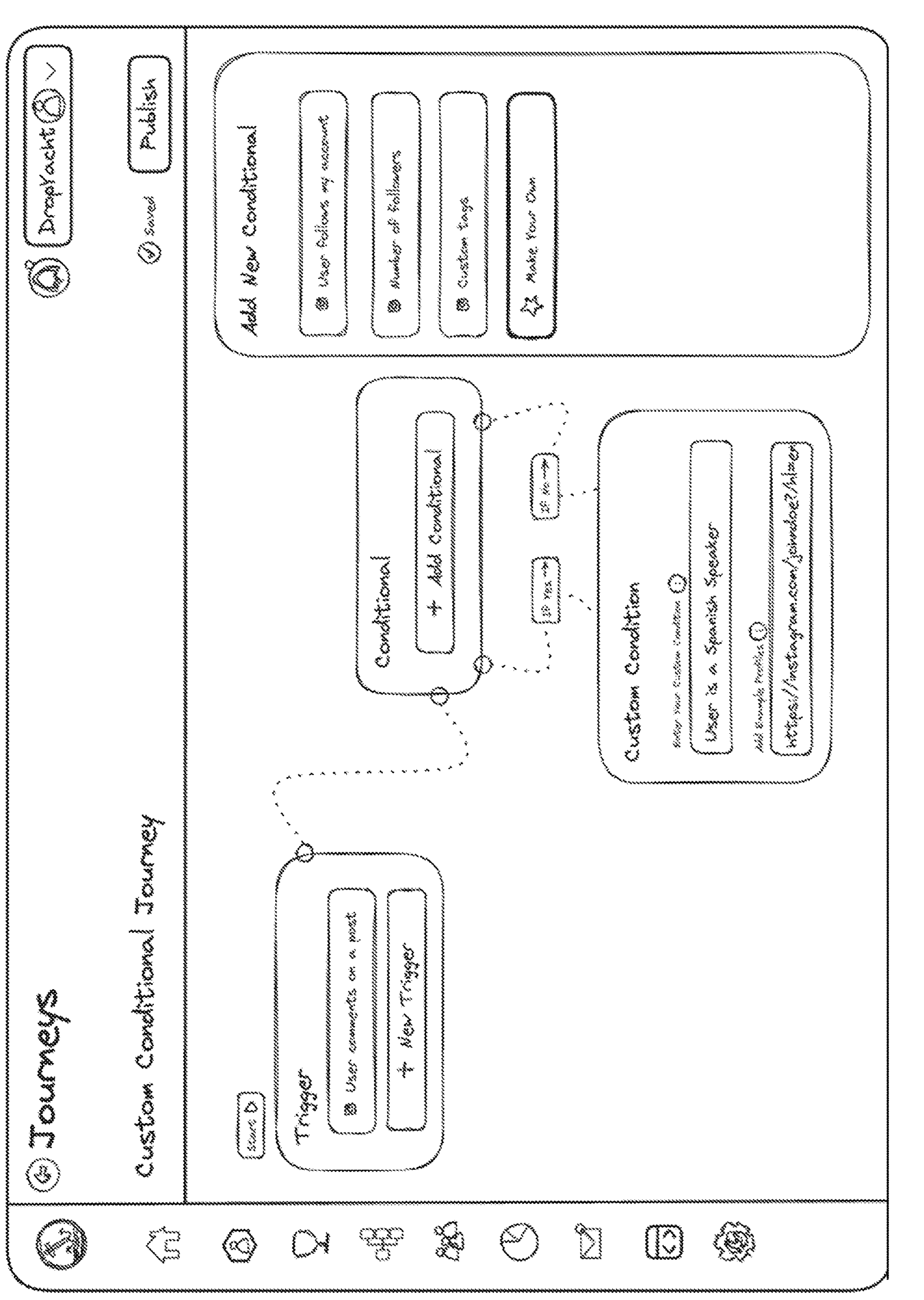
FIG. 2 illustrates an example screenshot showing an implementation of aspects of regular conditionals, according to some embodiments.

FIG. 2 illustrates an example screenshot 200 showing an implementation of aspects of predictive conditionals, according to some embodiments. As noted supra, a predictive conditional can be a condition that is specified in natural language. A trigger can be, by way of example, a user commenting on a post. A conditional can be added. An example is shown in screenshot 200 of a heuristic expression for a predictive conditional (e.g. user is a Spanish speaker). Other deterministic expressions are shown as well for illustrative purposes (e.g. user follows my account, number of followers) but should be noted that these add relevant context but are not part of the invention.

More specifically, screen shot 200 shows a mockup of a user interface within a flow builder for configuring automation on a social media platform. Flow builders can contain algorithmic conditional nodes or heuristic conditional nodes, which can be used in conjunction with or in lieu of one another. For example, there can be a rule that if a user has more than n-number of followers, then the flow follows a specified path. If the user has less than n-number followers then the flow follows another path. These two cases can be handled differently. As shown, a custom conditional can be utilized in lieu of a deterministic rule. With the custom conditional, a user can provide a written description of a condition. A prediction can be made that branches the flow according to the written description of the condition.

In the present example, the written description of the condition can be that the social media user is a Spanish speaker (by way of example). This written description of the condition does not need to be in a pre-configured template. In order to make the prediction, the system can provide examples of other social media users who are and/or are not satisfying the condition (e.g. other jazz musicians, venture capitalists, Spanish speakers, etc.). This is then used to automatically configure the flow builder algorithm (e.g. to predict which branch to select, etc.).

Figure 3:
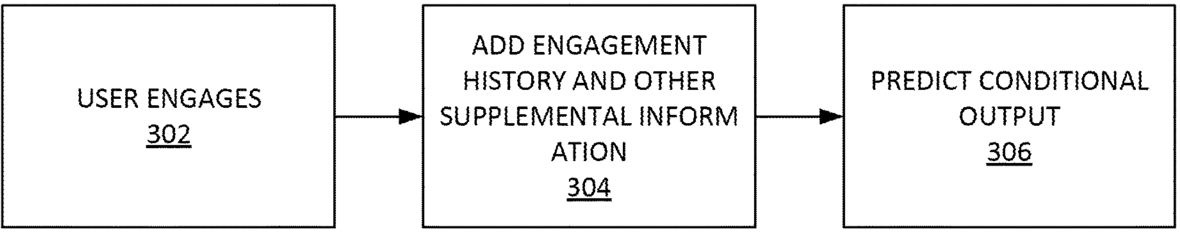
FIG. 3 illustrates an example predictive conditional process, according to some embodiments.
Figure 3:

FIG. 3 illustrates an example predictive conditional process 300, according to some embodiments. Any time a user engages on a social media platform, in step 302, process 300 detects and obtains the user engagement. In step 304, process 300 adds the user engagement to the user's engagement history. This can be maintained in a database of user engagements along with other user-relevant data (e.g. profile information, user biographical data, etc.). This data can be used to predict any needed output (e.g. with respect to these heuristic based conditions, etc. Accordingly, in step 306, process 300 uses the user's engagement history for implementing a predictive conditional output.

Figure 4:
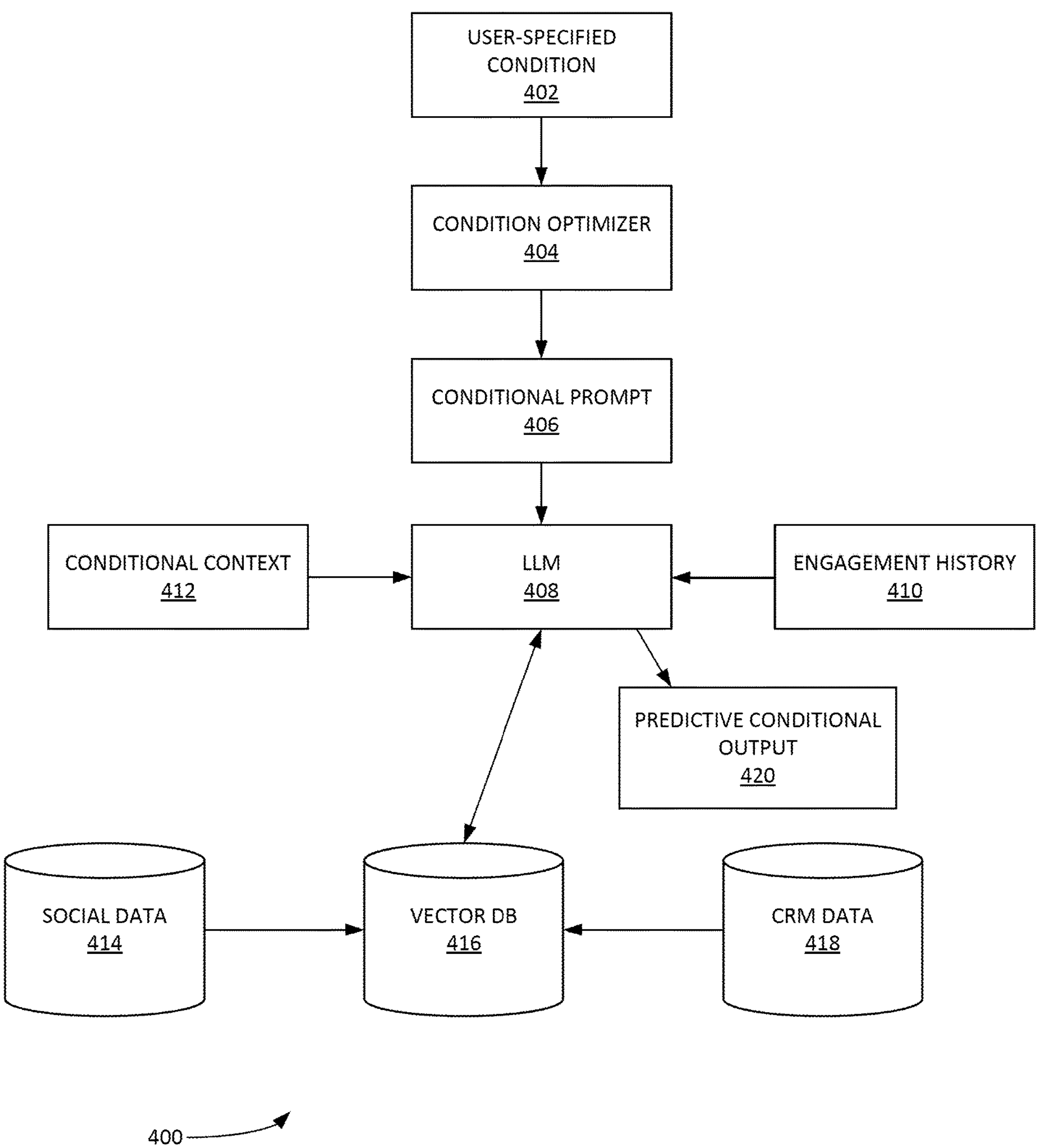
FIG. 4 illustrates an example process for generating a predictive conditional output, according to some embodiments.

FIG. 4 illustrates an example process 400 for generating a predictive conditional output, according to some embodiments. Process 400 can be used to implement step 306.

User-specified condition 402 can be the condition that the user specifies such as the user is a Spanish speaker, the user is a venture capitalist, the user is a jazz musician, etc. The condition is set by the admin/user that is configuring the flow. This condition can be what is to be tested for on a heuristic basis. It is noted that this may not have complete (100%) accuracy, but it is predicted as a best guess based on the data that is available.

Condition optimizer 404 can be a module that takes in the user input. The user input can be obtained from the user specified condition. The specified condition can be in a freeform. Condition optimizer 404 can optimize the specified condition and/or rewrite it in a way that will most likely make the output of the prediction have a highest accuracy. If the user writes a condition that is not well formed the condition optimizer 404 can rewrite it (e.g. using natural language processing algorithms, natural language generation algorithms, natural language optimization ML models, etc.).

Conditional prompt 406 can be a structure of the prompt that is passed to a large language model (LLM). Conditional prompt 406 contains all the information that the LLM needs. Conditional prompt 406 can include templates which are hydrated by example profiles and example data of people that fall into different categories it contains when passed to LLM 408. Conditional prompt 406 can include directives to actually predict the output and how the format of the prediction should look like.

LLM 408 loads in Engagement History 410, Conditional Context 412, and other relevant data pulled from the Vector DB 416. LLM 408 then synthesizes data from these sources to hydrate the Conditional Prompt 406 and use it to provide an evaluation of the User-Specified Condition 402. LLM 408 can be either an off-the-shelf model or a fine-tuned LLM. It is noted that LLM 408 intended to be replaceable with any LLM that fits best.

Conditional context 412 is the data from the user profile for any example profiles. Engagement history 410 can similarly be a user's post history for the user for which process 400 is making a prediction.

Social data 414 can be the social graph of the user's friends and/or connections. This is the social graph of the user for which process 400 is making a prediction. Process 400 can use the social graph to infer data about the current user given who they are connected to or their friends/social contacts with.

CRM data 418 is data about they're engagement specifically with the client who has kind of configured the custom conditional (e.g. may include purchase history, support requests, etc.). CRM data 418 and social data 414 can be synchronized and fed into the Vector DB 416.

Vector DB 416 can be a class of database used for organizing unstructured information in manner for a semantic search by a large language model to access it and retrieve it efficiently. A predictive conditional output 420 can be generated.

Figure 5:
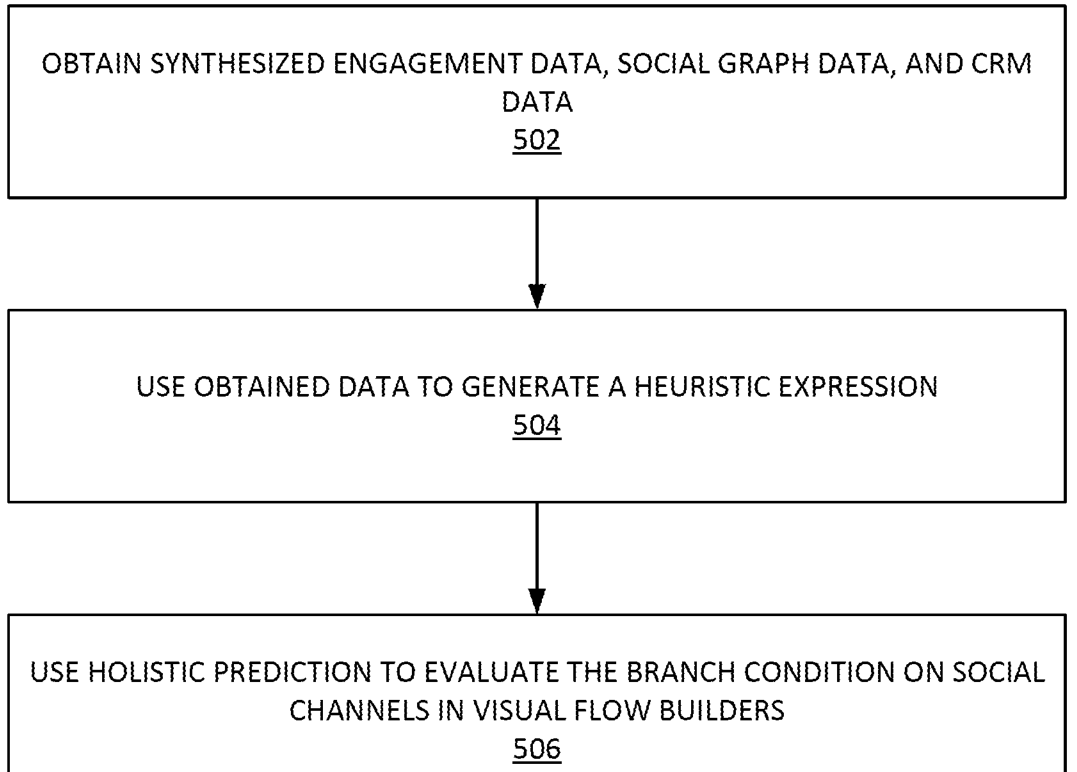
FIG. 5 illustrates an example process for s a heuristic expression, according to some embodiments.
Figure 5:

FIG. 5 illustrates an example process for evaluating a heuristic expression, according to some embodiments. In step 502, process 500 can obtain, inter alia, synthesized engagement data, social graph data, and CRM data. In step 504, process 500 can use the obtained data to generate a heuristic expression. In step 506, process 500 can use the holistic prediction to evaluate the branch condition on social channels in visual flow builders.

It is noted that this is an improvement on traditional rule-based expressions in flow builders which enable evaluation using only standard operator and operand syntax. For example, "A IS GREATER THAN OR EQUAL TO B"; "A CONTAINS B" "A IS NOT EQUAL TO B A", etc. Accordingly, current technology (e.g. the algorithmic expressions supra) are deterministic. But their rigidity means that the space of conditions that can be specified is limited.

Heuristic expressions in predictive conditionals can be used in conjunction with or in lieu of algorithmic expressions. Anything a user can express in plain English (and/or other natural language, etc.) can be specified as a condition. Accordingly, heuristic expressions in predictive conditionals can be an augmentation to algorithmic expressions where flexibility and robustness can be obtained at the tradeoff of introducing a false positive/negative rate. In contrast, the heuristic expressions generated by process 500 allow branching in visual flow builders based on natural language descriptions of the branch condition and are unique compared to this previously established paradigm.

Figure 6:
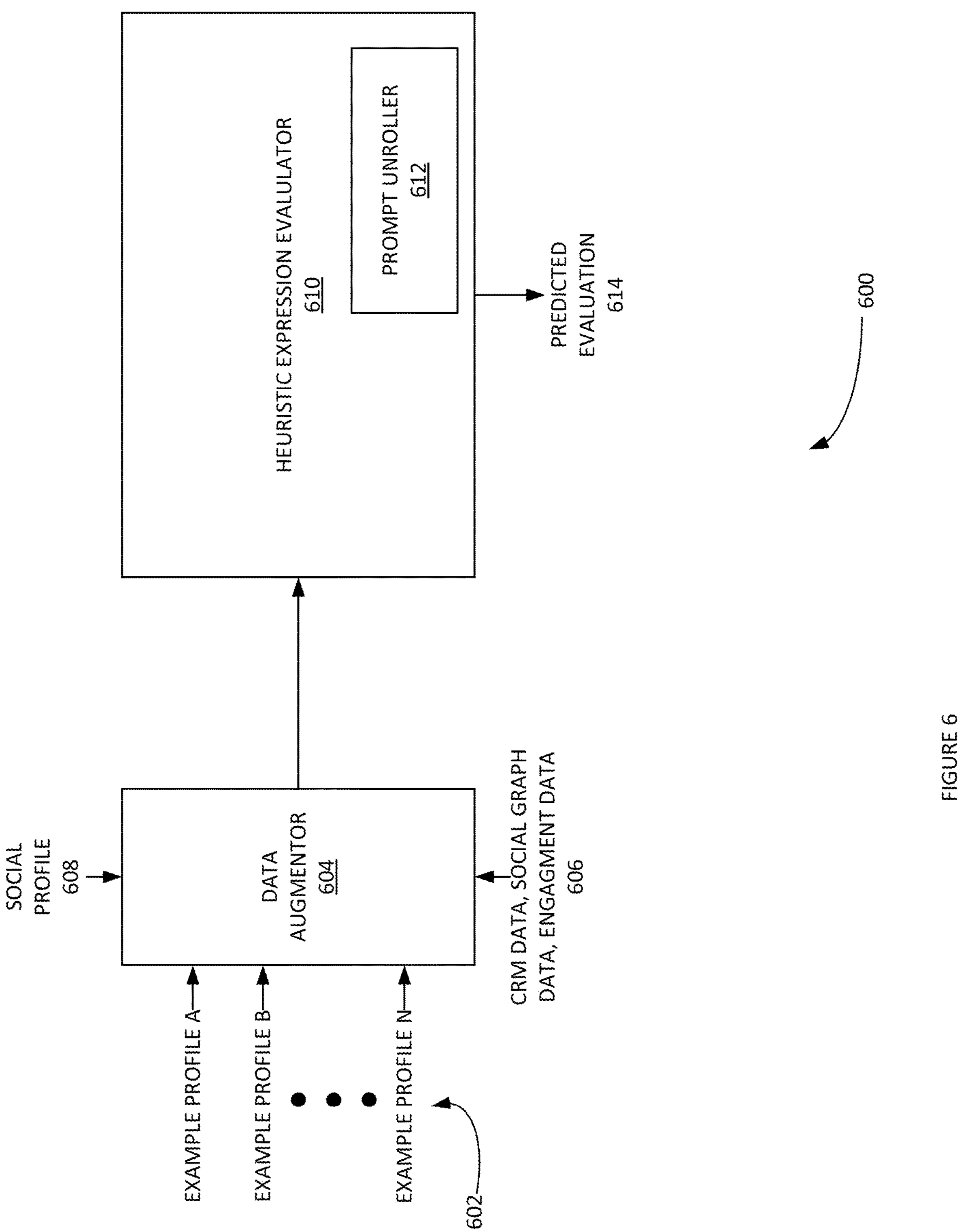
FIG. 6 illustrates an example process for generating a predicted evaluation, according to some embodiments.

FIG. 6 illustrates an example process 600 for generating a predicted evaluation, according to some embodiments. The system performs a prediction about social profiles using the natural language condition provided by the user, as well as a few example social profiles.

For each example profile that is provided either meets the condition or not. The A-N, CRM data, social graph data, engagement data 606, and social profile 608 is fed into the data augmenter 604. Data augmenter 604 takes each of those example profiles and extracts data that is relevant. For example, from the social profiles 608, data augmenter 604 can obtain relevant biographical description data. Data augmenter 604 can obtain user post history, social graph data engagement history, CRM data, etc. Data augmenter 604 can parse/unroll all this data about each profile and feed it into heuristic expression evaluator 610. Heuristic expression evaluator 610 uses this data along with the base prompt for asking a large language model for prediction to obtain devaluated predicted evaluation 614.

The predicted evaluation 614 is either a 'yes' or 'no', if it's 'yes', then process 600 can continue down one branch of the flow if it is 'no' the process can continue down another branch in the visual flow builder.

In one example, when a customer triggers this flow, a user triggers this flow then they might enter the conditional note and then the evaluation occurs and then you can see the two branches that come out of it are annotated with if 'yes' and if 'no', so the branch that is taken dependent on the output of the predicted evaluation.

In one example, several example profiles, and a new profile over which to apply the heuristic expression evaluation, can be passed to a data augmenter 604. Data augmenter 604 supplements the profiles with any known data and maps them into natural language representations of the profiles and the surrounding relevant context.

The condition along with these are passed to the heuristic expression evaluator 610, which includes a prompt unroller 612. For example, if the natural language condition is "User is a venture capitalist", a simplified data augmentation might be to unroll this into:

"You are an evaluation bot, and will be provided with a condition. You will have to decide if the condition evaluates to true or false.

Respond with only "true" or "false" as your final output, without any modified capitalization and without any added spacing or punctuation."

The condition can be "User is a venture capitalist".

Twitter user with username @mike_vc, display name 'Michael Scott', and bio 'Leader, innovator, mentor | Regional manager & friend @Dunder Mifflin | VC & Ice Cream fanatic |' evaluates to: 'true'.

Twitter user with username @DwightSchrute, display name 'Dwight Schrute 🚀', and bio 'Assistant (to) the regional manager @DunderMifflin Former: child, teen | Avid Star Trek fan' evaluates to: 'false'

Twitter user with username @david_dm, display name 'David Wallace | Entrepreneur and Venture Capitalist | Suck it', and bio 'Early stage investor in: myself. Scaling Suck It to a billion users' evaluates to:

" "

where the Twitter profiles for @mike_vc and @DwightSchrute are provided as examples and unrolled to include their handle, username, and bio. Process 600 does not unroll social graph data or CRM data here for brevity, but it is a natural extension to imagine how a standardized format can be specified for longer unrolls.

The target social profile over which the prediction is made (@david_dm) is unrolled in the same way. This is displayed here as a vehicle by which the invention is implemented.

A pre-hydration of this prompt is reproduced below for completeness:

" "

You are an evaluation bot, and will be provided with a condition. You will have to decide if the condition evaluates to true or false.

Respond with only "true" or "false" as your final output, without any modified capitalization and without any added spacing or punctuation.

The condition is "{condition}".

{examples}

{query}

This example shows how the process can provide zero or more "yes" examples and zero or more "no" examples in order give the LLM an idea of how to evaluate the heuristic expression.

Additional Example Computer Architecture and Systems

A Machine learning (ML) module can be provided and can implement various optimizations and models related to training the various AI models used herein. ML is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g. random decision forests) are an ensemble learning method for classification, regression, and other tasks, which operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consists of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. Finally, the test dataset is a dataset used to provide an unbiased evaluation of a final model fit on the training dataset. If the data in the test dataset has never been used in training (e.g. in cross-validation), the test dataset is also called a holdout dataset.

Figure 7:
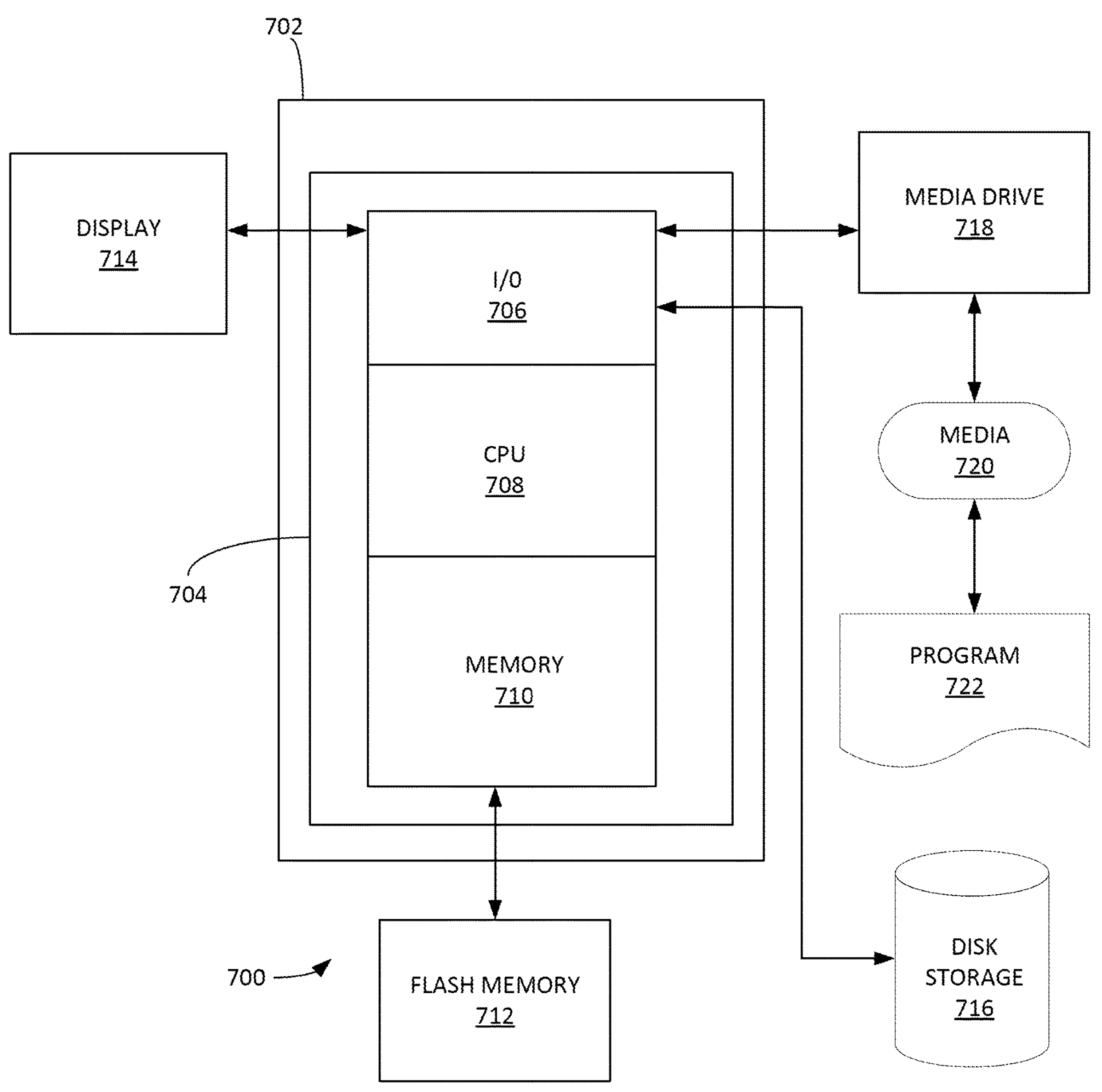
FIG. 7 is a block diagram of a sample computing environment that can be utilized to implement various embodiments.

FIG. 7 depicts an exemplary computing system 700 that can be configured to perform any one of the processes provided herein. In this context, computing system 700 may include, for example, a processor, memory, storage, and I/O devices (e.g., monitor, keyboard, disk drive, Internet connection, etc.). However, computing system 700 may include circuitry or other specialized hardware for carrying out some or all aspects of the processes. In some operational settings, computing system 700 may be configured as a system that includes one or more units, each of which is configured to carry out some aspects of the processes either in software, hardware, or some combination thereof.

FIG. 7 depicts computing system 700 with a number of components that may be used to perform any of the processes described herein. The main system 702 includes a motherboard 704 having an I/O section 706, one or more central processing units (CPU) 708, and a memory section 710, which may have a flash memory card 712 related to it. The I/O section 706 can be connected to a display 714, a keyboard and/or other user input (not shown), a disk storage unit 716, and a media drive unit 718. The media drive unit 718 can read/write a computer-readable medium 720, which can contain programs 722 and/or data. Computing system 700 can include a web browser. Moreover, it is noted that computing system 700 can be configured to include additional systems in order to fulfill various functionalities. Computing system 700 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed:

1. A computerized method comprising:

receiving, via a user interface of a flow builder, a freeform natural-language condition text defining a heuristic condition for a conditional node;

detecting an engagement event associated with a target profile and storing, in an engagement-history database, engagement history records associated with the target profile;

generating, by a data augmenter, a prompt payload for evaluating the heuristic condition by: selecting a plurality of example profiles that include (i) at least one positive example profile labeled as satisfying the heuristic condition and (ii) at least one negative example profile labeled as not satisfying the heuristic condition;

obtaining, for each of the plurality of example profiles and for the target profile, profile data comprising at least biographical description data and post history data;

obtaining, for the target profile, social graph records representing social connections of the target profile;

obtaining, for the target profile, customer relationship management records representing interactions between the target profile and an administrator configuring a flow in the flow builder;

synchronizing the customer relationship management records and the social graph records into a vector database that organizes unstructured information for semantic search access by a large language model;

retrieving, from the vector database, a set of records associated with the target profile, wherein the set of records includes at least one of the engagement history records, the social graph records, or the customer relationship management records;

structuring a prompt template that includes (i) a base prompt in template form configured to be hydrated with profile data and retrieved records and (ii) an output constraint requiring a binary output that consists of only a first token corresponding to true and a second token corresponding to false, without modified capitalization and without added spacing or punctuation;

hydrating the prompt template using (i) the freeform natural-language condition text, (ii) normalized representations of the set of records associated with the target profile, and (iii) normalized representations of the plurality of example profiles;

submitting the prompt payload to a large language model to obtain a model output;

validating the model output against the output constraint and, in response to validating the model output, extracting a predicted evaluation comprising the binary output; and executing the conditional node in the flow builder by selecting, based on the predicted evaluation, a first branch when the predicted evaluation corresponds to true and selecting a second branch when the predicted evaluation corresponds to false.

2. The computerized method of claim 1, wherein the freeform natural-language condition text is received from an administrator configuring a flow in the flow builder.

3. The computerized method of claim 2, wherein the predicted evaluation infers data about the target profile based on social connections represented by the social graph records associated with the target profile.

4. The computerized method of claim 3, wherein the engagement history records comprise a post history of the target profile that is relevant to the predicted evaluation.

5. The computerized method of claim 4, wherein the customer relationship management records comprise interaction data between the target profile and a client that configured the heuristic condition in the flow builder.

6. The computerized method of claim 5, wherein retrieving the set of records from the vector database comprises performing a semantic search over unstructured information organized in the vector database to retrieve records responsive to the freeform natural-language condition text.

7. The computerized method of claim 6, further comprising, prior to hydrating the prompt template, determining that the freeform natural-language condition text is not well formed and rewriting the freeform natural-language condition text using at least one machine-learning model to generate a rewritten condition text used to hydrate the prompt template.

8. The computerized method of claim 7, wherein generating the prompt payload further comprises obtaining, by the data augmenter, biographical description data for the plurality of example profiles and the target profile, and unrolling the biographical description data into standardized natural-language representations included in the prompt payload.

9. The computerized method of claim 8, wherein executing the conditional node comprises evaluating a heuristic expression corresponding to the heuristic condition using the predicted evaluation to control branching in a visual flow builder.

10. A computerized method comprising:

receiving, via a user interface of a flow builder, a freeform natural-language condition text defining a heuristic condition for a conditional node;

generating, by a data augmenter, a prompt payload for evaluating a heuristic expression corresponding to the heuristic condition by:

selecting zero or more positive example profiles labeled as satisfying the heuristic condition and zero or more negative example profiles labeled as not satisfying the heuristic condition;

retrieving, from a vector database that organizes unstructured information for semantic search access by a large language model, a set of records associated with a target profile, the set of records including at least one of engagement history records, social graph records, or customer relationship management records;

structuring a prompt template including (i) a base prompt in template form configured to be hydrated with the freeform natural-language condition text, the set of records, and the selected example profiles and (ii) an output constraint requiring a binary output that consists of only a first token corresponding to true and a second token corresponding to false, without modified capitalization and without added spacing or punctuation;

hydrating the prompt template using (i) the freeform natural-language condition text, (ii) normalized representations of the set of records associated with the target profile, and (iii) normalized representations of the selected example profiles;

submitting the prompt payload to a large language model to obtain a model output;

validating the model output against the output constraint and, in response to validating, extracting a predicted evaluation comprising the binary output;

evaluating the heuristic expression for the conditional node using the predicted evaluation; and executing the conditional node in the flow builder by selecting, based on the predicted evaluation, a first branch when the predicted evaluation corresponds to true and selecting a second branch when the predicted evaluation corresponds to false.

* * * * *